(12) United States Patent
De Haan et al.

(10) Patent No.: US 7,058,227 B2
(45) Date of Patent: Jun. 6, 2006

(54) PROBLEM AREA LOCATION IN AN IMAGE SIGNAL

(75) Inventors: Gerard De Haan, Eindhoven (NL); Anna Pelagotti, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 723 days.

(21) Appl. No.: 10/196,817

(22) Filed: Jul. 17, 2002

(65) Prior Publication Data

US 2002/0186889 A1    Dec. 12, 2002

Related U.S. Application Data

(63) Continuation of application No. 09/374,696, filed on Aug. 16, 1999, now Pat. No. 6,487,313.

(30) Foreign Application Priority Data

Aug. 21, 1998  (EP)  .................................. 98202818

(51) Int. Cl.
*G06K 9/48*  (2006.01)
*G06K 9/36*  (2006.01)
*G06K 9/40*  (2006.01)
*H04N 5/14*  (2006.01)

(52) U.S. Cl. ...................... 382/236; 382/199; 382/266; 348/699

(58) Field of Classification Search ................ 382/236, 382/242, 266, 107, 199; 348/451, 452, 586, 348/699, 700; 345/640
See application file for complete search history.

(56) References Cited

U.S. PATENT DOCUMENTS

| 5,103,488 A | 4/1992 | Gemello et al. ............ 382/199 |
| 5,534,946 A | 7/1996 | De Haan et al. ............ 348/619 |
| 5,717,463 A | 2/1998 | Brailean et al. ....... 375/240.12 |
| 5,764,803 A | 6/1998 | Jacquin et al. ............... 382/236 |
| 5,777,682 A | 7/1998 | De Haan et al. ............ 348/452 |
| 5,832,115 A * | 11/1998 | Rosenberg .................... 382/199 |
| 5,995,668 A | 11/1999 | Corset et al. ............... 382/233 |
| 6,005,639 A | 12/1999 | Thomas et al. ............. 348/699 |
| 6,008,865 A | 12/1999 | Fogel ......................... 348/700 |
| 6,075,875 A | 6/2000 | Gu ............................. 382/107 |
| 6,157,745 A * | 12/2000 | Salembier .................... 382/236 |
| 6,219,436 B1 | 4/2001 | De Haan et al. ............ 382/107 |

FOREIGN PATENT DOCUMENTS

EP     0475499     11/1995

(Continued)

OTHER PUBLICATIONS

Pradas et al, Motion and Region Overlapping Estimation for Segmentation-Based Video Coding, Nov. 1994, IEEE International Conference on Image Processing, ISBN: 0-8186-6950, vol. II, pp. 428-432.*

(Continued)

*Primary Examiner*—Mehrdad Dastouri
(74) *Attorney, Agent, or Firm*—Edward W. Goodman

(57) ABSTRACT

In a method of locating problem areas in an image signal (I), a motion vector field (Df) is estimated for the image signal (I), and edges are detected in the motion vector field (Df). In a corresponding method of interpolating images between existing images (I), image parts are interpolated (MCI) in dependence upon a presence of edges; preferably, an order statistical filtering (med) is used at edges.

2 Claims, 3 Drawing Sheets

FOREIGN PATENT DOCUMENTS

| | | |
|---|---|---|
| GB | 2279531 | 1/1995 |
| GB | 2291306 | 1/1996 |
| JP | 09214899 A | 8/1997 |
| WO | WO9120155 | 12/1991 |
| WO | WO9317520 | 9/1993 |
| WO | WO9704403 | 2/1997 |
| WO | WO9704600 | 2/1997 |

OTHER PUBLICATIONS

"Robust Motion-Compensated Video Upconversion", O.A. Ojo and G. de Haan, IEEE Transactions on Consumer Electronics, vol. 43, Nov. 1997, pp. 1045-1056.

* cited by examiner

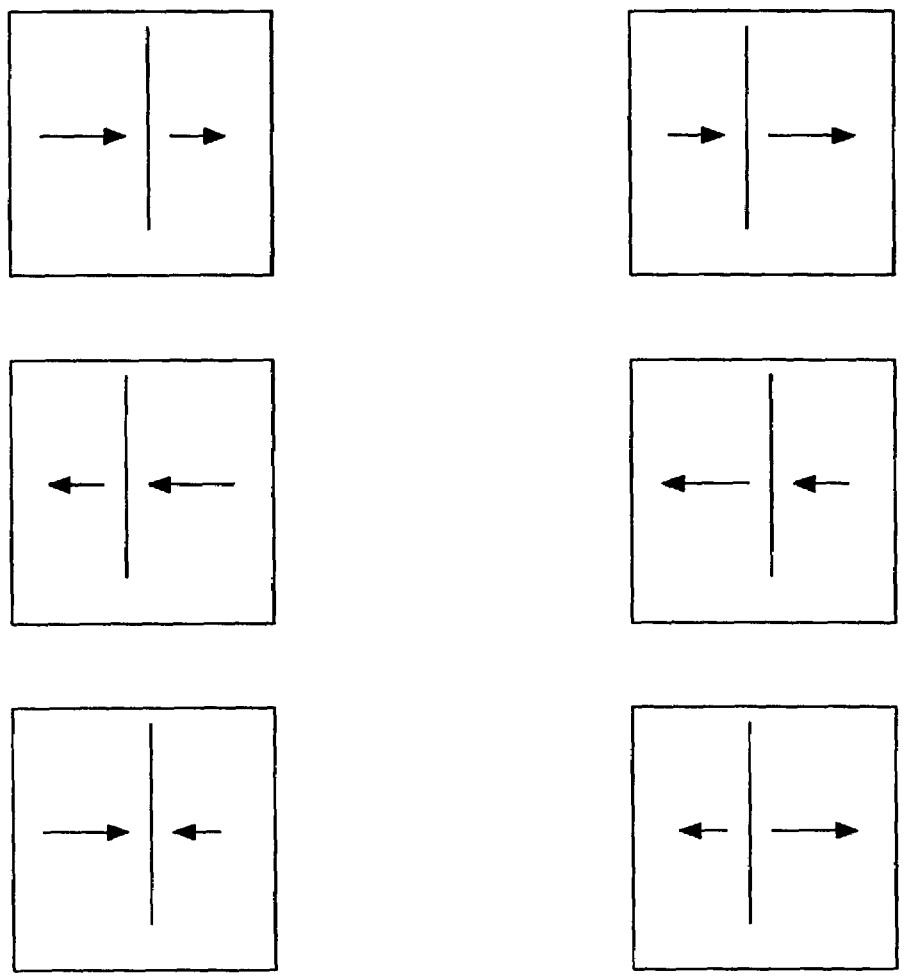
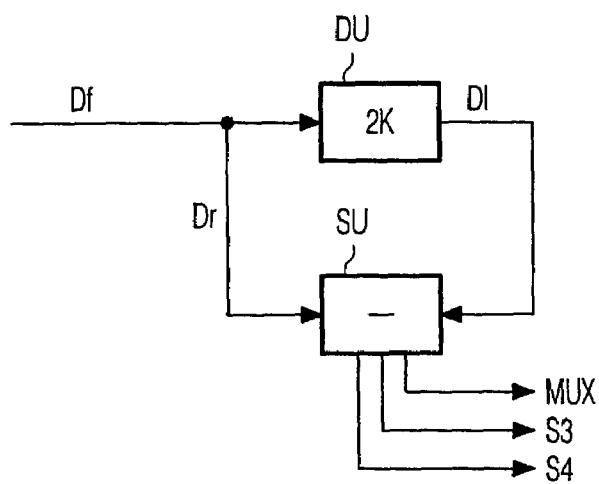
FIG. 1
FIG. 5

PROBLEM AREA LOCATION IN AN IMAGE SIGNAL

CROSS-REFERENCE TO RELATED APPLICATIONS

This is a continuation of U.S. patent application Ser. No. 09/374,696, filed Aug. 16, 1999 now U.S. Pat. No. 6,487,313.

BACKGROUND OF THE INVENTION

1. Field of the Invention

The invention relates to problem area location in an image signal, and more specifically, to occlusion detection and halo reduction in motion compensated pictures.

2. Description of the Related Art

Every motion compensated scan-rate conversion method is confronted with the problem of occlusions in a sequence. Several approaches have been attempted to cope with it. In many cases, the effort has been devoted at improving the quality of the motion estimation method in order to have very precise motion boundaries (e.g., see Ref. 1). But in the regions where covering or uncovering occurs, and where the motion estimation is performed by analyzing two successive frames, motion estimation is an ill-posed problem (see Ref. 2) and cannot yield good results. To overcome this problem, many authors propose to use three frames (see Refs. 3, 4 and 5) or four frames (see Ref. 6), for both motion estimation and motion compensation. When architectural constraints suggest to use two frames only, an ad hoc interpolation strategy has to be introduced. This strategy can be applied on every pixel of the image or can be preceded by the localization of critical areas, i.e., by a segmentation of the image.

In Ref. 7, a method was disclosed for motion compensated picture signal interpolation that reduces the negative effect of covering and uncovering on the quality of interpolated images. In the described case, this applies an order statistical filter in the up-conversion to replace the common MC-averaging, interpolated pictures result from pixels taken from both adjacent fields.

In Ref. 2 and in Ref. 8, a segmentation for the same purpose was described. This segmentation is based on a motion detector, and can only produce reliable results if covering and uncovering occur of stationary backgrounds.

In Ref. 9, a method was disclosed that allows a reduction of halo defects in architectures that enable access to one field only, or in systems particularly designed to have access to one field only in order, to obtain the increased resolution of an interpolation according to Ref. 10.

In Ref. 11, a method was disclosed that uses two motion estimators, a causal motion estimator (that predicts the future from the past) and an anti-causal motion estimator (that predicts the past from the future). Depending on which one of the two estimators gives the 'best match', the area is classified as covered or uncovered, and the corresponding luminance value is taken from the previous or the next field.

In Ref. 12, the interpolation strategy is tuned depending on the 'difficulties' of the image part. It combines several of the well-known algorithms for motion compensation, aiming at exploiting their complementary strengths. The task of selecting the appropriate algorithm is assigned to an Ordered Statistical filter. Where no adequate strategy is available, like in covered/uncovered areas, it aims at softening the resulting artifacts.

Instead, in Ref. 13, it is stated that the general rule for an effective interpolation seems to be: "if it is not possible to shift a small detail correctly because of faulty motion vectors, better suppress it than smooth it". This is achieved, when there is a faulty vector assigned and a correlated picture content, extending the median mask used to filter the candidates from the neighboring frames, and where there is no correlated picture content, using the probability distribution function of a Centered Median Filter, to select the candidates.

SUMMARY OF THE INVENTION

It is, inter alia, an object of the invention to provide a straightforward and reliable occlusion detection and halo reduction. To this end, a first aspect of the invention provides a method and device for locating problem areas in an image signal. A second aspect of the invention provides a corresponding method and device for interpolating images between existing images. A third aspect of the invention provides an image display apparatus incorporating such an image interpolation device.

In a method of locating problem areas in an image signal, a motion vector field is estimated for the image signal, and edges are detected in the motion vector field. In a corresponding method of interpolating images between existing images, image parts are interpolated in dependence upon a presence of edges; preferably, an order statistical filtering is used at edges.

The current invention basically adapts the interpolation strategy depending on a segmentation of the image in various areas. Contrary to Refs. 2 and 8, the current invention aims to be valid even if both foreground and background are moving.

These and other aspects of the invention will be apparent from and elucidated with reference to the embodiments described hereinafter.

BRIEF DESCRIPTION OF THE DRAWINGS

In the drawings:

FIG. 1 illustrates the basic recognition on which the present invention is based;

FIG. 5 shows a region detector for use in the embodiment of FIG. 4.

DESCRIPTION OF THE PREFERRED EMBODIMENTS

Figure 2:
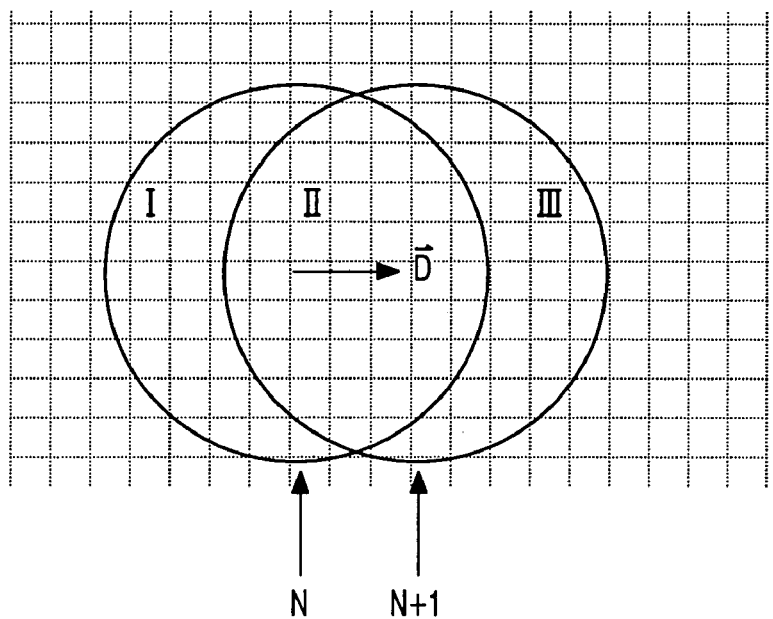
FIGS. 2 and 3 illustrate covering and uncovering.

Our method aims first at localizing, in a robust and cost-effective way, the areas where vector-based algorithms for scan rate conversion can produce very strong and annoying artifacts. For those areas, several solutions are proposed, depending on the target quality of the up-conversion and on the cost constraints. The usefulness of this approach shall be proven in a comparison with the aforementioned alternatives, although their benchmarking has not yet been completed.

In order to detect areas in which covering or uncovering occur, the current algorithm just needs the information that is available in a motion vector field related to that frame, and a very limited processing of that information. In fact, the motion vector field already describes the temporal behavior of the sequence, generally obtained using more than one frame, thus no additional information is needed for only covering/uncovering detection.

The current algorithm does not need an ad hoc motion estimation, provided that the motion vector field used is intended to supply the true motion within the sequence. The first step of the algorithm consists in detecting significant discontinuities in the given motion vector field, assuming that these correspond to the borders of moving objects.

FIG. 1 shows a vertical line and two arrows at opposite sides of the vertical line. Assuming that the vertical line is an edge in the motion vector field, and the arrows represent the motion vectors at the two sides of the edge, by analyzing the vectors on both sides of the edges, we can conclude that there is covering when the longest vector points towards the edge, or, when the two vectors have the same length, when both the vectors point towards the edge. Similarly, there is uncovering when the longest vector points in the direction opposite to the edge, or if the two vectors have the same length, when they both point in directions opposite to the edge. The three pictures at the left-hand side of FIG. 1 show covering, while the three pictures at the right-hand side of FIG. 1 show uncovering. From an analysis of FIG. 1, it is also possible to determine the width of the covered or uncovered area.

In a more formal way, let D(X, n) be the displacement vector assigned to the center $X=(Xx, Xy)^T$ of a block of pixels B(X) in the current field n, we check the vector difference of the displacement vectors Dl(X−K, n) and Dr(X+K, n), where $K (k, 0)^T$ and k is a constant. These motion vectors are those assigned to blocks situated on, respectively, the left and the right hand side of every block B(X) in the current field n.

In a first approach, we have taken only horizontal edges into consideration, because they occur most frequently in sequences. Extending the algorithm in order to consider edges in every direction is straightforward. When the absolute differences for both x and y components are higher than a threshold value thre:

$$|x_{\vec{D}l(\vec{X}-\vec{K},n)} - x_{\vec{D}r(\vec{X}+\vec{K},n)}| > thre \quad (1)$$

$$|y_{\vec{D}l(\vec{X}+\vec{K},n)} - y_{\vec{D}r(\vec{X}+\vec{K},n)}| > thre \quad (2)$$

we decide that there is a significant edge within the block centered in X=(Xx, Xy).

Of course, all the neighboring blocks of a block in which an edge has been detected have to be considered blocks in which covering or uncovering can occur. They will undergo the same procedure as those in which an edge has been directly detected. If edges have been located, we can use the vector difference between Dl and Dr, to decide upon covering or uncovering. Considering positive the sign of a vector pointing from right to left, in case:

$$\vec{Dl}(\vec{X}-\vec{K}, n) - \vec{Dr}(\vec{X}+\vec{K}, n) > 0 \quad (3)$$

there will be uncovering, whereas:

$$\vec{Dl}(\vec{X}-\vec{K}, n) - \vec{Dr}(\vec{X}+\vec{K}, n) < 0 \quad (4)$$

indicates covering.

Moreover, we are able to determine the covering or uncovering width $c/u_{width}$ and height $c/u_{height}$ of the area that has been covered or uncovered between the previous and the current fields. These are related to the absolute difference for the x and the y components of the vector difference:

$$c/u_{width} = |x_{\vec{D}l(\vec{X}+\vec{K},n)} - x_{\vec{D}r(\vec{X}+\vec{K},n)}| > thre \quad (5)$$

$$c/u_{height} = |y_{\vec{D}l(\vec{X}+\vec{K},n)} - y_{\vec{D}r(\vec{X}+\vec{K},n)}| > thre \quad (6)$$

In order to know which of the two vectors belongs to the background and which one to the foreground, and thus where the foreground and the background are, we have to consider that the edges move with the foreground velocity. Comparing two successive motion vector fields, i.e., the location of the edges in these two fields, it is possible to say with which of the two velocities the edges move. The velocity with which an edge moves will be the foreground velocity, and the part of the image that is interested by that velocity will be the foreground. On the opposite side of the edge, there will be the background, with associated the background velocity.

Figure 3:
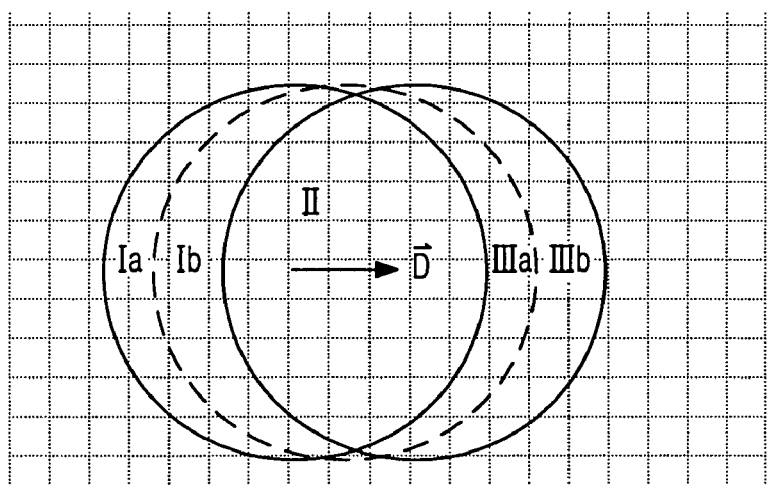

The resolution of the edges localization, such as we have described it till here, is not finer than the, say, 8×8 pixels block size used by the motion vector estimator. A less coarse method is preferred. In order to improve on that, i.e., in order to have a better localization of 'real covered/uncovered' areas at the interpolated position, and an accurate choice of the vectors to be used in the up-conversion, we have developed two methods that exploit the information gathered till here. What is intended for 'real covered/uncovered' areas is shown in FIG. 2 and in FIG. 3, where it is illustrated how, at the temporal position of the frame to be interpolated, only a portion of the area I (III) that has detected as covered (uncovered) from frame N to frame N+1 is actually covered, Ia (uncovered, IIIB).

The first refinement method developed is similar to what has been described in a previous patent application (see Ref. 14). It makes use of two different match errors calculated for the same 2×2 block at the wanted interpolated position, using two different candidate vectors. In this application, they would be the vector on the left-hand side of the edge, and the vector on the right-hand side of the edge. If at least one of the two errors is smaller than a pre-defined threshold, we assume that the block we are dealing with belongs to the foreground, i.e., it does not belong to a 'really covered/uncovered' area. In this case, the vector, among the two tested, that gives the least error is the vector chosen to interpolate the foreground. The other one should describe the displacement of the background in the neighboring blocks.

The second method, that will be described hereafter, also makes use of the fact that in 'real covering/uncovering' areas, the match error at the interpolated position is high whatever vector is used, since, as we know, no good match is possible here. This second method only needs one match error and will look for the gradient of it along a line, from left to right (or vice versa), in every portion of the frame in which covering or uncovering has been detected.

Using one of the two vectors on the sides of the edge, we calculated, in fact, on every 2×2 block belonging to the 8×8 block that we know being interested by either covering or uncovering, the SAD error ϵ at the temporal position of the frame to be interpolated:

$$\epsilon(\vec{D}, \vec{X}, n + tpos) = \sum_{\vec{X} \epsilon b'(\vec{X})} |F(\vec{x} - tpos\vec{D}, n) - F(\vec{x} + (1 - tpos)\vec{D}, n + 1)| \quad (7)$$

We assume that this error will have a sudden increase as soon as the area considered belongs to the 'real covered/uncovered' areas. The edge of the covered/uncovered areas is set in the 2×2 block where the error is the double of the error calculated for the block on its left. The width of the covered/uncovered areas is known from that previously described in equation (5). Thus, it is possible to extrapolate where the covering/uncovering areas are within the frame.

Experiments have proven that the first method performs better than the second one. The operations count, when we consider a peak load of 10%, is comparable for the two methods, thus we would propose the first method as preferred embodiment.

Once we have a clear classification of the areas in the interpolated frame as belonging to three distinct categories, i.e., present in both frames, really covered and really uncovered, and we know where the background is, what velocity it has, and where the foreground is and what velocity it has, we can design an ad hoc interpolation strategy.

We now propose to use different interpolation strategies for the various regions categorized as described above.

A first approach, the simplest one, will not reduce the visual artifacts in the occlusion areas compared to the previous method. However, it can provide a way to obtain a generally improved output with respect to classical methods, such as, the motion-compensated 3-tap median filtering, or the motion-compensated averaging, applied on the entire frame. Moreover, the operation count can be strongly reduced in comparison with what is required with the median method, since the ordered statistical filtering is needed only for a portion of pixels in the frame that is generally not bigger then 10%. This method seems to be particularly interesting for software implementation, e.g., on the Philips Trimedia processor (TM1000, TM2000), since it provides a quality which is better than that of a 'median' approach, with an operation count reduced to about ¼ of that of the median method.

This approach uses only the information on where the occlusion areas are, i.e., where significant edges in the motion vector field have been detected:

$$F(\vec{x}, n + tpos) = \begin{cases} med(F(\vec{x} - tpos\vec{D}(\vec{x}, n), n), Av, F(\vec{x} + (1 - tpos)\vec{D}(\vec{x}, n), n + 1, & \text{(occlusion areas)} \\ \frac{1}{2}(F(\vec{x} - tpos\vec{D}(\vec{x}, n), n) + \frac{1}{2}F(\vec{x} + (1 - tpos)\vec{D}(\vec{x}, n), n + 1), & \text{(otherwise)} \end{cases} \quad (8)$$

I.e., we propose to use motion-compensated 3-tap median filtering in occlusion areas, and motion-compensated averaging otherwise.

If the goal is to have better interpolation, it seems best to interpolate the result from the previous field only, or mainly, in case of 'real covering' of the background (region IIIB in FIG. 3), whereas, in case of 'real uncovering' of the background (region Ia in FIG. 3), the motion-compensated data from the current field is preferred in the interpolation process. In all other cases, the motion-compensated interpolator can use the data from both fields. A way to do this is described in the following equation:

$$F(\vec{x}, n + tpos) = \begin{cases} med(F(\vec{x} - tpos\vec{D}_{cov}(\vec{x}, n), n), Av, F(\vec{x} - tpos\vec{D}(\vec{x}, n), n), & \text{(covering areas)} \\ med(F(\vec{x} + (1 - tpos)D_{un\ cov}(\vec{x}, n), n + 1), Av, F(\vec{x} + (1 - tpos)\vec{D}(\vec{x}, n), n + 1), & \text{(uncovering areas)} \\ \frac{1}{2}F(\vec{x} - tpos\vec{D}(\vec{x}, n), n) + \frac{1}{2}F(\vec{x} + (1 - tpos)\vec{D}(\vec{x}, n), n + 1), & \text{(otherwise)} \end{cases} \quad (9)$$

This method provides an increased quality compared with the previous methods, and can also provide a reduced operation count, due to the fact that the more expensive operation (the median filter) will be applied only on a small portion of the frame.

Figure 4:
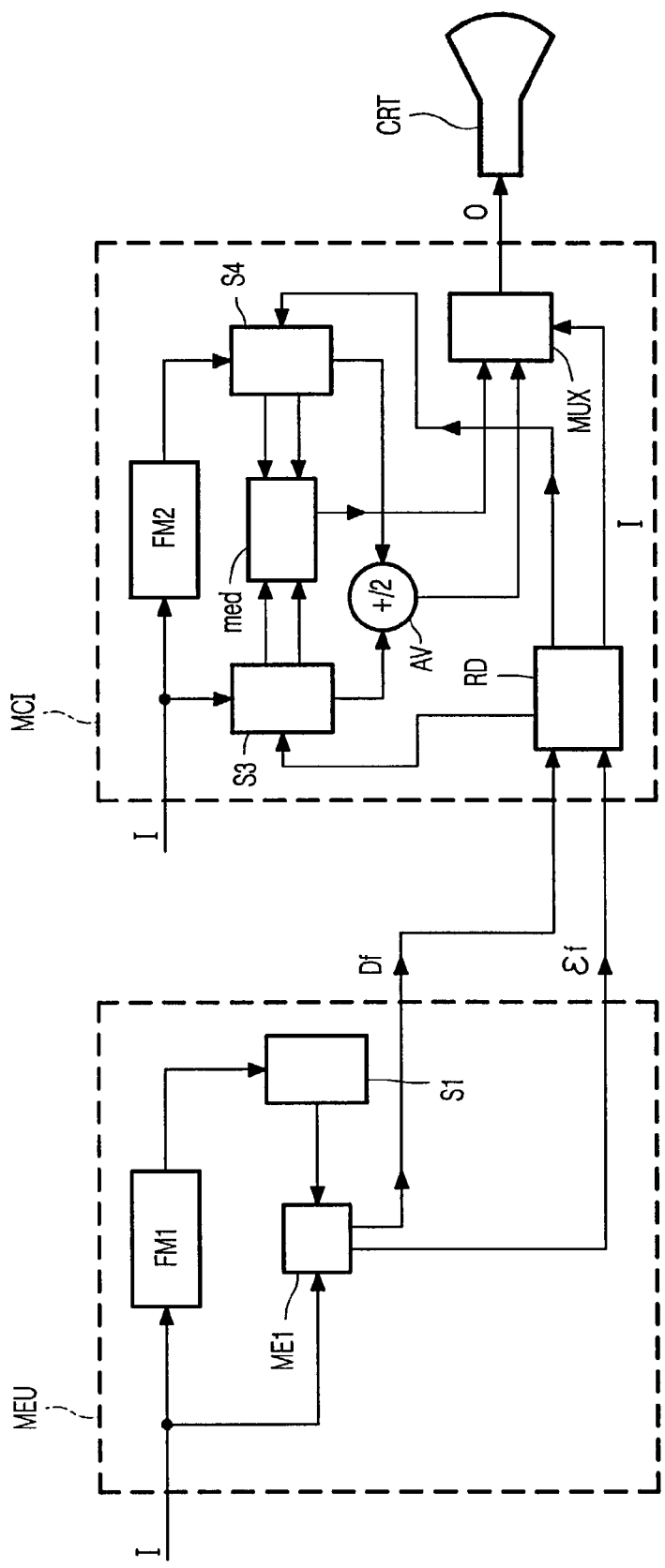
FIG. 4 shows a preferred embodiment of an image display apparatus in accordance with the present invention.

A preferred embodiment of the current invention is shown in the block diagram of FIG. 4. An input video signal I is applied to a motion estimator unit MEU having a motion vector estimator ME1. In the motion estimator unit MEU, the input video signal I is applied to a field delay FM1, and to a first input of the first motion vector estimator ME1. An output signal of the field delay FM1 is applied to a second input of the motion vector estimator ME1 thru a shifter S1. The motion vector estimator ME1 supplies motion vectors Df and corresponding motion estimation errors εf.

The input video signal I is also applied to a motion-compensated interpolator MCI. In the motion-compensated interpolator MCI, the input video signal I is applied to a field delay FM2, and to a shifter S3. An output of the field delay FM2 is applied to a shifter S4. The shifters S3, S4 are controlled by the motion vectors Df received from the motion estimator unit MEU. Outputs of the shifters S3, S4 are applied to a median circuit med and to an average circuit Av. Outputs of the median circuit med and the average circuit Av are applied to a multiplexer MUX which supplies the output signal O to a display device CRT for displaying the output signal at, for example, a 100 Hz field rate. The motion vectors Df and their errors εf are applied to a region detector RD which furnishes a control signal to the multiplexer MUX. In accordance with the present invention, this region detector RD carries out an edge detection and determines the height and width of covered/uncovered areas as described above.

FIG. 5 shows a region detector RD for use in the embodiment of FIG. 4. The motion vectors Df, estimated by the motion estimation unit Df, are applied to a delay unit DU to furnish left-hand motion vectors Dl and right-hand motion vectors Dr. These motion vectors Dl, Dr are applied to a subtraction unit operating in accordance with the equations (1) to (6) described above, to obtain control signals for the multiplexer MUX and the shifters S3, S4 of FIG. 4.

In sum, the algorithm described herein aims first at localizing, in a robust and cost-effective way, covering/uncovering areas. In those areas, motion-compensated scan rate conversion can produce very strong and annoying artifacts. To reduce them, several solutions have been proposed, depending on the target quality of the up-conversion and on the cost constraints. When the target is improving the cost effectiveness, an up-conversion strategy can be chosen that provides a quality comparable to that of standard methods, with an operations count reduced to ≈⅓ of that of the median method. With a somewhat smaller gain (or a comparable effort), also the quality' can be improved. This method seems to be particularly interesting for software implementation, e.g., on the Philips Trimedia processor (TM1000-TM2000) but we believe that it could improve any up-conversion strategy.

Salient features of the invention can be summarized as follows:

A method, and apparatus realizing this method, that locates 'occlusion (difficult) areas' in a frame, comprising: means to estimate a motion vector field, and characterized in that it exploits the output of an edge detector acting on the motion vector field.

Such a method, and apparatus realizing this method, in which the detector signals locations in the picture, where the difference in x-component of the motion vector of horizontally neighboring vectors (or the difference in y-component of the motion vector of vertically neighboring vectors) exceeds a threshold, thus giving an indication on where the occlusion areas' are (without distinction between covered or uncovered areas).

Such a method, and apparatus realizing this method, in which the difference plus the difference in signs of the aforementioned motion vectors give indication on where the covered areas and the uncovered areas are.

Such a method, and apparatus realizing this method, in which interpolation means, for interpolating pictures in between existing ones, is adapted to the presence of difficult areas by using a motion compensation averaging or a plain shift over the motion vector of the nearest existing picture to generate the output interpolated picture in areas where the edge detector finds no discontinuities, and using an order statistical filter to interpolate picture parts in which the edge detector signals a discontinuity.

Such a method, and apparatus realizing this method, in which interpolation means, for interpolating pictures in between existing ones, is adapted to the presence of covered or uncovered areas by using a motion compensation averaging or a plain shift over the motion vector of the nearest existing picture to generate the output interpolated picture in areas where the edge detector finds no discontinuities, and using mainly either of the two neighboring frames for interpolating the occlusion areas, depending if a covered area or an uncovered area has been detected.

A method, and apparatus realizing this method, for interpolating pictures in between existing ones, comprising: means to estimate a motion vector field, and means to interpolate pictures from existing ones using this motion vector field, characterized in that the interpolation means adapt to the output of an edge detector acting on the motion vector field.

Such a method, and apparatus realizing this method, in which the detector signals locations in the picture, where the difference in x-component of the motion vector of horizontally neighboring vectors (or the difference in y-component of the motion vector of vertically neighboring vectors) exceeds a threshold.

Such a method, and apparatus realizing this method, in which the adaptation consists in using a motion-compensated average or a plain shift over the motion vector of the nearest existing picture to generate the output interpolated picture in areas where the edge detector finds no discontinuities, and using an order statistical filter to interpolate picture parts in which the edge detector signals a discontinuity.

Such a method, and apparatus realizing this method, in which the order statistical filter uses information from the previous picture shifted over the motion vector, information from the next picture shifted (backwards) over the motion vector, and a non-motion-compensated average of the neighboring pictures, to calculate the output.

Such a method, and apparatus realizing this method, in which the above-mentioned refinement is applied.

It should be noted that the above-mentioned embodiments illustrate rather than limit the invention, and that those skilled in the art will be able to design many alternative embodiments without departing from the scope of the appended claims. The word "comprising" does not exclude the presence of other elements or steps than those listed in a claim. The expression "at" also includes the notion "near". The invention can be implemented by means of hardware comprising several distinct elements, and by means of a suitably programmed computer. In the device claim enumerating several means, several of these means can be embodied by one and the same item of hardware.

LIST OF REFERENCES (1) F. Dufaux and F. Moscheni, "Motion estimation techniques for digital TV: a review and a new contribution," in Proceeding of the IEEE, vol. 83 no. 6, pp. 858–876, 1995.

(2) A. M. Tekalp, Digital Video Processing. Upper Saddle River, NK 07458: Prentice Hall PTR, 1995.

P. Csillag and L. Boroczky, "Frame rate conversion based on acceleration and motion-based segmentation," in SPIE, vol. 2952, pp. 438–448, 1996.

(4) R. Depommier and E. Dubois, "Motion estimation with detection of occlusion areas," in Proc. IEEE ICASSP '92, vol. 3, (San Francisco), pp. 269–273, March 1992.

(5) K. Kawaguchi and S. K. Mitra, "Frame rate up-conversion considering multiple motion," in ICIP, 1997.

G. Thomas and M. Burl, "Video signal processing.", International Patent Application WO 91/20155.

(7) G. de Haan, P. Biezen, H. Huijgen, and O. Ojo, "Motion compensated picture interpolation apparatus.", European Patent Application No. 92201388.3, corresponding to U.S. Pat. No. 5,534,946 (PHNI4.066).

(8) R. Thoma and M. Bierling, "Motion compensating interpolation considering covered and uncovered background," Signal Processing: Image communication, vol. 1, pp. 191–212, 1989.

(9) G. de Haan and P. Biezen, "Motion compensated interpolation.", European Patent Application No. 95200604, corresponding to U.S. Pat. No. 5,777,682 (PHN 15.216).

(10) G. de Haan and G. D. Poortere, "Motion compensated frame rate conversion.", European Patent Application EP-A 0 475 499.

(11) G. Thomas and M. Burl, "Video image processing.", International Patent Application WO-A 92/05662, corresponding to U.S. Pat. No. 6,005,639.

(12) O. Ojo and G. de Haan, "Robust motion-compensated video upconversion," in IEEE Transactions on Consumer Electronics, vol. 43, pp. 1045–1057, 1997.

(13) H. Blume and H. Schröder, "Image format conversion—algorithms, architectures, applications," in Proceedings of the ProRISC/IEEE Workshop on Circuits, Systems and Signal Processing, (Mierlo (NL)), pp. 19–37, November 1996.

(14) G. de Haan and A. Pelagotti, "Motion detection and motion compensated interpolation.", European Patent Application No. 97202562.1, corresponding to U.S. Pat. No. 6,219,436 (PHN 16.587 EP-P).

The invention claimed is:

1. A method of locating problem areas in an image signal, the method comprising the steps:
   estimating a motion vector field for said image signal;
   detecting edges in the motion vectors field; and
   comparing edge locations in successive field periods to identify both foreground and background.

2. A device for locating problem areas in an image signal, the device comprising:
   means for estimating a motion vector field for said image signal; and
   means for detecting edges in the motion vector field, wherein said device comprises:
   means for comparing edge locations in successive field periods to identify both foreground and background.

* * * * *